United States Patent
Kawashima et al.

(10) Patent No.: US 9,890,578 B2
(45) Date of Patent: Feb. 13, 2018

(54) GLASS PANEL GAP RETENTION MEMBER AND METHOD FOR MANUFACTURING SAME

(71) Applicants: NIPPON SHEET GLASS COMPANY, LIMITED, Tokyo (JP); THE UNIVERSITY OF SYDNEY, Sydney (AU)

(72) Inventors: Yumi Kawashima, Narashino (JP); Osamu Asano, Chiba (JP); Cenk Kocer, Sydney (AU)

(73) Assignees: Nippon Sheet Glass Company, Limited, Tokyo (JP); The University of Sydney, Sydney (AU)

( * ) Notice: Subject to any disclaimer, the term of this patent is extended or adjusted under 35 U.S.C. 154(b) by 0 days.

(21) Appl. No.: 15/100,467

(22) PCT Filed: Dec. 4, 2014

(86) PCT No.: PCT/JP2014/082074
§ 371 (c)(1),
(2) Date: May 31, 2016

(87) PCT Pub. No.: WO2015/083770
PCT Pub. Date: Jun. 11, 2015

(65) Prior Publication Data
US 2016/0298377 A1  Oct. 13, 2016

(30) Foreign Application Priority Data
Dec. 6, 2013  (JP) .............................. 2013-253393

(51) Int. Cl.
*B32B 15/01*  (2006.01)
*E06B 3/673*  (2006.01)
(Continued)

(52) U.S. Cl.
CPC ............ *E06B 3/67326* (2013.01); *C23F 1/00* (2013.01); *E06B 3/6608* (2013.01);
(Continued)

(58) Field of Classification Search
None
See application file for complete search history.

(56) References Cited

U.S. PATENT DOCUMENTS 3,350,772 A * 11/1967 Ulam ..................... B23K 20/04
                                                      228/228
4,103,076 A *  7/1978 Ulam ..................... A47J 36/02
                                                      428/652
(Continued)

FOREIGN PATENT DOCUMENTS

EP         1 018 493 A1      7/2000
JP        H10-507500    *    7/1998 ............. B32B 17/06
(Continued)

OTHER PUBLICATIONS

Office Action dated Nov. 7, 2017 in priority Japanese application with English translation.

*Primary Examiner* — Seth Dumbris
(74) *Attorney, Agent, or Firm* — Dilworth & Barrese, LLP

(57) ABSTRACT

In a gap retention member to be disposed between a pair of glass plates when a circumference of a gap formed between the pair of glass plates with their plate faces opposing each other is to be sealed to maintain the gap under a depressurized state, the gap retention member includes hard portions to contact the pair of glass plates respectively and a soft portion disposed between the hard portions and having a lower hardness than the hard portions, the soft portion being more susceptible to deformation based on a shearing force effective in the direction along the opposing faces of the (Continued)

glass plates than deformation based on a compressive force effective in a thickness direction perpendicular to the opposing faces of the glass plates.

8 Claims, 2 Drawing Sheets

(51) Int. Cl.
    *E06B 3/663*     (2006.01)
    *C23F 1/00*     (2006.01)
    *E06B 3/66*     (2006.01)
    *E06B 3/677*     (2006.01)

(52) U.S. Cl.
    CPC ........ *E06B 3/6612* (2013.01); *E06B 3/66304* (2013.01); *E06B 3/66309* (2013.01); *E06B 3/66333* (2013.01); *E06B 3/66357* (2013.01); *E06B 3/677* (2013.01); *Y02B 80/24* (2013.01)

(56) References Cited

U.S. PATENT DOCUMENTS

| | | |
|---|---|---|
| 5,891,536 A | 4/1999 | Collins et al. |
| 6,054,195 A | 4/2000 | Collins et al. |
| 6,071,575 A | 6/2000 | Collins et al. |
| 6,083,578 A | 7/2000 | Collins et al. |
| 6,966,208 B1 * | 11/2005 | Collins .................. B21F 45/00 72/204 |
| 2003/0214623 A1 | 11/2003 | Ebisu et al. |

FOREIGN PATENT DOCUMENTS

| | | |
|---|---|---|
| JP | H11-349358 A | 12/1999 |
| JP | 2002-226238 A | 6/2002 |
| JP | 2003-512278 A | 4/2003 |
| JP | 2004-94117 A | 3/2004 |
| JP | 2005-200301 A | 7/2005 |
| WO | 1999/64365 A1 | 12/1999 |

* cited by examiner

Fig.4
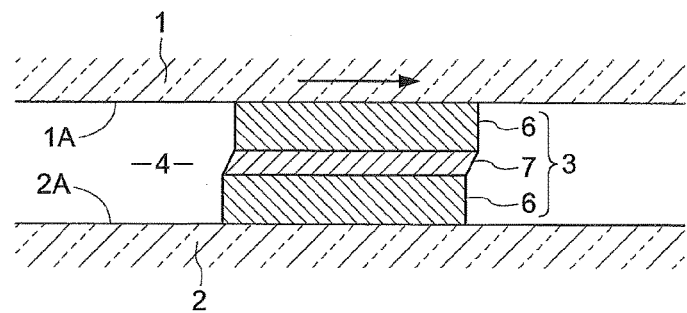
Fig.5
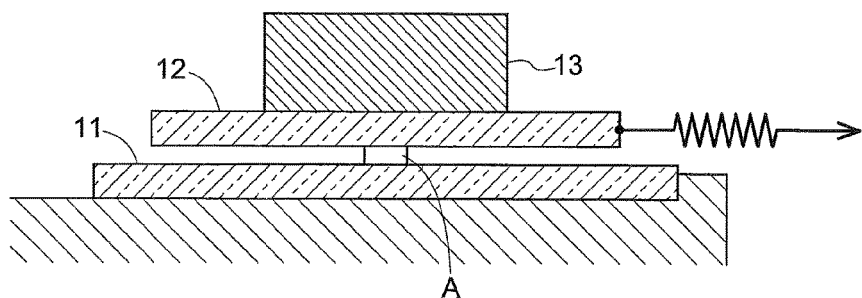
Fig.6
| sample | structure | structure schematic image | times | static friction coefficient | average value |
|---|---|---|---|---|---|
| Example1 | stainless steel/Al/stainless steel | | 1 | 0.10 | 0.09 |
| | | | 2 | 0.10 | |
| | | | 3 | 0.06 | |
| Example2 | stainless steel/Al/stainless steel | | 1 | 0.18 | 0.21 |
| | | | 2 | 0.21 | |
| | | | 3 | 0.19 | |
| | | | 4 | 0.26 | |
| Comparison Example1 | stainless steel | | 1 | 0.39 | 0.42 |
| | | | 2 | 0.45 | |
| | | | 3 | 0.42 | |
| | | | 4 | 0.44 | |
| | | | 5 | 0.42 | |
| Comparison Example2 | Al/stainless steel/Al | | 1 | 0.24 | 0.26 |
| | | | 2 | 0.21 | |
| | | | 3 | 0.28 | |
| | | | 4 | 0.32 | |

GLASS PANEL GAP RETENTION MEMBER AND METHOD FOR MANUFACTURING SAME

TECHNICAL FIELD

This disclosure relates to a glass panel gap retention member, many of which are to be disposed between a pair of glass plates in manufacturing of a vacuum multilayer glass panel. This disclosure relates also to a method of manufacturing such glass panel gap retention member.

BACKGROUND ART

In a vacuum multilayer glass panel comprising a pair of glass plates with their circumferential portions being sealed and depressurized, the panel is subjected to a compressive force due to the atmospheric pressure from the outside of the glass plates. For this reason, between the pair of glass plates, a plurality of gap retention members having a high compression strength are disposed with a predetermined spacing from each other. When an external force is applied to the vacuum multilayer glass panel, its glass plates will be warped so that the glass plates will be moved relative to each other along the direction of the faces thereof. In the course of this, the gap retention members can be displaced or destroyed, or in an even worse case, concentration of load at some limited portion(s) of the glass plates may sometimes cause breakage of the glass plates.

Therefore, the vacuum multilayer glass panel is configured such that a cushioning layer is formed between the respective glass plate and the gap retention members in order to suppress occurrence of such local stress concentration to the glass plates and also to reduce the frictional resistance therebetween for facilitating movement of the glass plates relative to the gap retention members. For instance, in the case of a technique disclosed in Patent Document 1, a gap retention member includes a core material having a high compression strength and a cushioning layer provided at least at one end portion of the core material and made of a soft material such as a soft metal. As the soft material can easily be deformed, the gap retention member can conform to the glass plate more smoothly, thus enhancing the strength of the glass plate against a shearing stress.

CITATION LIST

Patent Literature

Patent Document 1: Japanese Unexamined Patent Application Publication No. H10-507500

SUMMARY OF INVENTION

Technical Problem

Such gap retention member is made generally by a mechanical means such as a press work or laser cut on steel material, aluminum material or the like, or an etching work which is a molding or surface treatment utilizing a corrosive action of a chemical agent. The etching work has advantages such as no generation of burr, strain, warp etc. which are of some concern in a press work, readiness of shape change via an etching pattern, no need for expensive mold, jig, etc. However, in case a soft metal is disposed on the outer side of the gap retention member, making of the gap retention member by an etching work is difficult. This is because the soft metal is melted more easily than the core material portion of the gap retention member during the etching work, which makes it difficult to form the soft metal into a desired shape and thickness.

The present invention has been made in view of the above-described state of the art to provide a glass panel gap retention member capable of retaining a predetermined spacing in a vacuum multilayer glass without compromising its outer appearance and effectively absorbing a positional displacement between the pair of glass plates in their face direction, and a method of manufacturing such glass panel gap retention member.

Solution to Problem

According to a characterizing feature of a glass panel gap retention member relating to the present invention, there is provided a glass panel gap retention member to be disposed between a pair of glass plates when a circumference of a gap formed between the pair of glass plates with their plate faces opposing each other is to be sealed to maintain the gap under a depressurized state, the glass panel gap retention member comprising: hard portions to contact the pair of glass plates respectively; a soft portion disposed between the hard portions and having a lower hardness than the hard portions; and the soft portion being more susceptible to deformation based on a shearing force effective in a direction along the opposing faces of the glass plates than deformation based on a compressive force effective in a thickness direction perpendicular to the opposing faces of the glass plates.

With the above-described configuration wherein the soft portion is more susceptible to deformation based on a shearing force effective in the direction along the opposing faces of the glass plates than deformation based on a compressive force effective in a thickness direction perpendicular to the opposing faces of the glass plate, in the gap retention member, deformation thereof in the thickness direction is suppressed. On the other hand, with respect to a relative movement between the pair of glass plates, as the soft portion is deformed based on a shearing force, the gap retention member can easily conform to the surfaces of the glass plates. As this lessens the shearing force exerted from the gap retention member to the glass plates along the face direction, breakage of the pair of glass plates will occur less likely According to a further characterizing feature of the glass panel gap retention member relating to the present invention, the hard portions are formed of stainless steel material and the soft portion is formed of aluminum material which is rolled in the direction along the opposing faces.

As the hard portions are formed of stainless steel material, the shape of the outer side members coming into contact with the surfaces of the glass plates can be stable. Whereby, even when there occur change in the glass plate surface from a planar shape to a non-planar shape or vice versa, due to repeated application of load generated from wind pressure or the like to the glass plates for an extended period or local application of a shock thereto, there will occur no plastic deformation in the shape of the hard portions in association therewith and the shape of the hard portions can be stably maintained. Therefore, under a normal condition free from any wind pressure application, no inconvenience such as change in the area of contact between the glass plate and the hard portions will occur and the contact state can always remain the same and the gap retention function can be maintained for an extended period.

Further, as the soft portion is formed of aluminum material which is rolled in the direction along the opposing faces, the soft portion is more to susceptible to shearing deformation along the surfaces of the glass plates than compressive deformation in the thickness direction of the glass plates. In this way, with the gap retention member having the above-described configuration, the shearing force effective between the pair of glass plates too can be absorbed easily According to a further characterizing feature of the glass panel gap retention member relating to the present invention, the hard portions and the soft portion are in contact with each other under a non-bonded state.

The language "non-bonded state" in the above-described arrangement means a simple arrangement such as an arrangement of the hard portions and the soft portion being pressed against each other with an appropriate force. Thus, the language excludes such arrangement as connecting between the hard portions and the soft portion with using an adhesive agent additionally Even with the above-described arrangement, as a compressive force due to the atmospheric pressure is applied constantly to the gap retention member once this gap retention member has been mounted to the vacuum multilayer glass, the relative position between the hard portions and the soft portion can be maintained appropriately. On the other hand, when there occurs a mutual positional displacement between the glass plates in opposite directions along the face direction, the hard portions and the soft portion can easily move relative to each other along the face direction. For instance, in case a unit area of the glass plate to be born by an individual gap retention member is large so that the individual gap retention member is subjected to a large load and a large amount of relative movement occurs in the face direction resulting from warping deformation of the glass plate, such easily deformable gap retention member as described above will be advantageous.

According to a still further characterizing feature of the glass panel gap retention member relating to the present invention, the hard portions and the soft portion are joined to each other integrally.

With such integral joining of the hard portions and the soft portion as provided in the above-described arrangement, the gap retention member can be handled easily in manufacturing of the vacuum multilayer glass. Moreover, the shape of the gap retention member can be more stable, so that it becomes possible to cause the soft material to provide its deformation property with higher precision. In the case of the above arrangement, since the hard portions and the soft portion are joined to each other, relative movement will occur less likely between the interfaces thereof when a shearing force along the face direction of the glass plates is applied to the gap retention member. Namely, the resistance against the shearing force will be increased. Therefore, the gap retention member having the above-described arrangement can be suitably used in e.g. a vacuum multilayer glass using glass plates having high strength capable of withstanding large bending.

According to a characterizing feature of a method of manufacturing a glass panel gap retention member relating to the present invention, there is provided a method of manufacturing a glass panel gap retention member to be disposed between a pair of glass plates when a circumference of a gap formed between the pair of glass plates with their plate faces opposing each other is to be sealed to maintain the gap under a depressurized state, the method comprising a disposing step of disposing hard portions formed of a hard metal on opposing sides of a soft portion formed of a soft metal and an etching step of etching outer circumferences of the hard portions and the soft portion.

By effecting an etching treatment with disposing the hard portions on the opposing sides of the soft portion, this etching treatment can be effected with minimizing the exposed area of the soft portion. As a result, unwanted etching of the soft portion in the thickness direction can be inhibited in particular and the etching treatment can be carried out with maintaining the shape of the gap retention member as desired.

BRIEF DESCRIPTION OF DRAWINGS

FIG. 4 is a function explanatory diagram of the gap retention member relating to the present invention, FIG. 5 is a diagram illustrating a determination method of an example, and FIG. 6 is a table showing determination results of the example.

DESCRIPTION OF EMBODIMENTS

Next, embodiments of the present invention will be explained with reference to the accompanying drawings.

Figure 1:
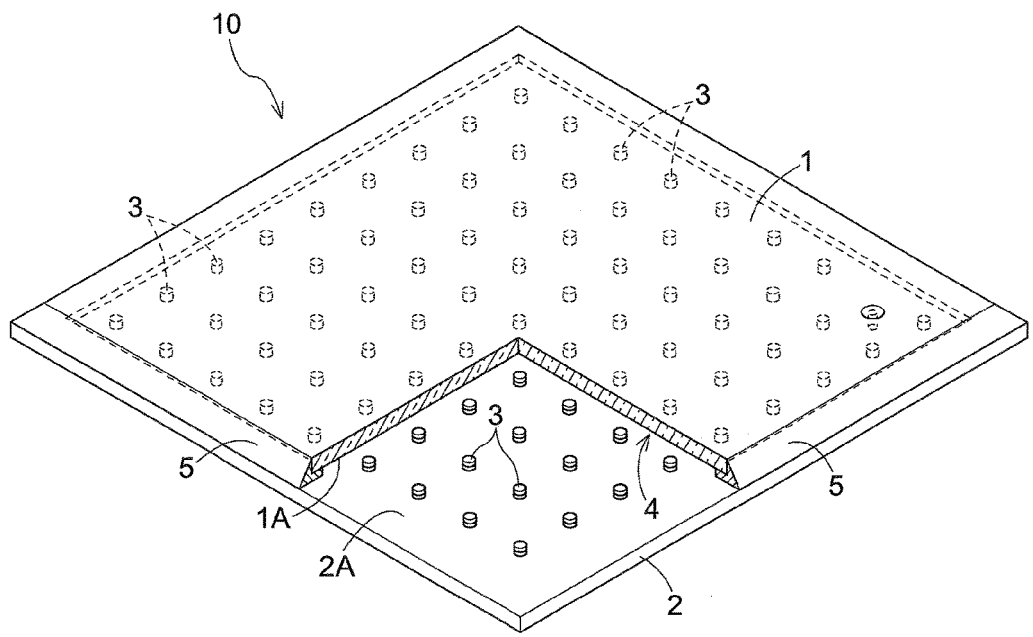
FIG. 1 is a partially cutaway perspective view showing an outer appearance of an example of a glass panel relating to the present invention.

As shown in FIG. 1, in a glass panel 10, between opposing faces 1A, 2A of a pair of glass plates 1, 2, a plurality of spacers 3 (an example of "gap retention member") are disposed to form a gap 4 between one opposing face 1A and the other opposing face 2A. The gap 4 is maintained air-tight along the circumferential portions of the pair of glass plates 1, 2. In the circumferential portions of the opposing faces 1A, 2A of the pair of glass plates 1, 2, an amount of sealing material 5 such as a low-melting point glass, a metal material containing lead, tin, indium, etc. is disposed in a fused state, thus providing air-tight seal between the pair of glass plates 1, 2 and the inside of the gap 4 is maintained under a depressurized state. The plurality of spacers 3, each one of which can be formed e.g. cylindrical, are disposed between the glass plates 1, 2.

Figure 2:
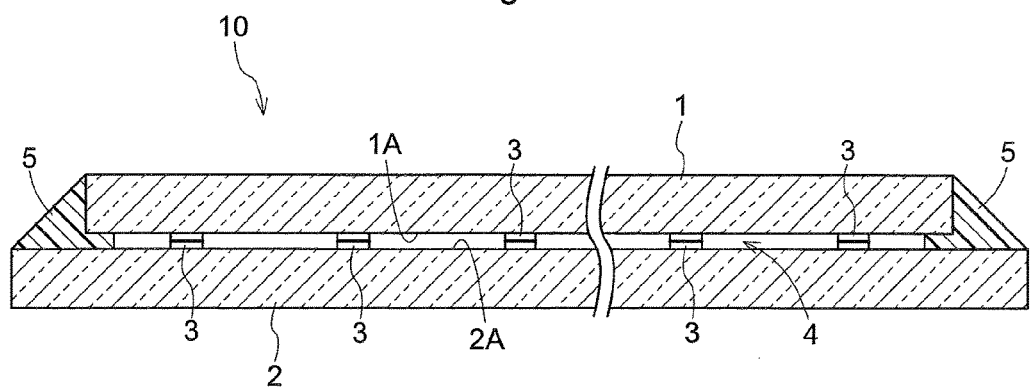
FIG. 2 is a vertical section view of principal portions of the one example of the glass panel relating to the present invention.

The glass panel 10 is assembled as described below. As shown in FIG. 1, the plurality of spacers 3 are disposed between the opposing faces 1A, 2A of the pair of glass plates 1, 2 to form the gap 4 between the glass plates 1, 2. Then, the glass plates 1, 2 are integrated to each other by joining these glass plates 1, 2 each other through fusing with the sealing material 5 made of a low-melting point glass for sealing the circumferences thereof. Thereafter, gas present in the gap 4 is suctioned through a suction vent provided in one of the pair of glass plates 1, 2 and then the suction vent is sealed, thus completing the glass panel 10 (see FIG. 2).

Figure 3:
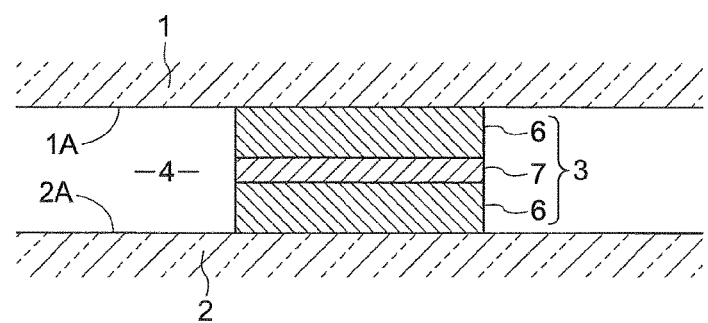
FIG. 3 is an enlarged vertical section view of a gap retention member relating to the present invention.

The spacer 3, as shown in FIG. 3, is comprised of two layers of hard portions 6 which come into contact with the opposing faces 1A, 2A of the glass plates 1, 2 respectively and a soft portion 7 sandwiched between these hard portions 6.

The hard portions 6 are formed of a material that has compression resistance capable of withstanding pressures applied from plate faces of the glass plates 1, 2 and can withstand also a high-temperature process such as firing, baking, etc. and that also does not discharge gas once the glass panel 10 has been manufactured. Specifically, a hard metal material or ceramic material is preferred. More specifically, metal materials such as iron, tungsten, nickel, chrome, titanium, molybdenum, carbon steel, chrome steel, nickel steel, stainless steel, nickel chromium steel, manganese steel, chrome manganese steel, chrome molybdenum steel, silicon steel, nichrome, duralumin, etc., ceramic materials such as corundum, alumina, mullite, magnesia, yttria, aluminum nitride, silicon nitride, etc. can be cited as examples.

The soft portion 7 is provided between the upper and lower hard portions 6. Specifically, this portion is formed of a soft metal material such as aluminum, copper, nickel, iron, chromium, tin, lead, platinum, indium, zinc, copper, silver, gold or alloys thereof. The soft portion 7 is formed of using e.g. a rolling material and configured such that its rolling direction is aligned along the surfaces of the glass plates. With this, deformation based on a shearing force in the direction along the opposing faces 1A, 2A will occur more easily than deformation based on a compression force in the thickness direction perpendicular to the opposing faces 1A, 2A of the glass plates 1, 2.

With the above-described arrangement, deformation of the spacer 3 in the thickness direction can be suppressed and as for relative movement along the face direction of the glass plates 1, 2, the soft portion 7 will be deformed when receiving a shearing force, thus allowing the relative movement between the glass plates 1, 2 (FIG. 4).

The hard portions 6 are formed of e.g. stainless steel. In this regard, as the members or parts coming into contact with the surfaces of the glass plates 1, 2 are formed of a hard material, the shape of the hard portions 6 can be maintained even after long period of use of the glass plates 1, 2. During use of the vacuum multilayer glass panel, the glass plates 1, 2 will be subjected to repeated application of load due to e.g. wind pressure, so that there will occur repeated alternate deformations in the surfaces of the glass plates 1, 2 between a planar shape and a non-planar shape. For this reason, if the material coming into contact with the glass plates 1, 2 were a soft material, the angles of the glass plates 1, 2 coming into contact with the surface of such soft material would vary and the surface shape of the soft portion 7 would change into a curved shape progressively and eventually. In such case, the surface of the soft portion 7 would come into point-contact with the surfaces of the glass plates, 1, 2 under a normal state free from any wind pressure application in particular. Then, under this condition, if an instantaneous wind pressure is applied to the surfaces of the glass plates, 1, 2, the surfaces of the glass plates 1, 2 will be pressed hard in a locally concentrated manner, so that breakage of the glass plates 1, 2 will tend to occur.

On the other hand, if the surface-side members which come into contact with the glass plates 1, 2 are the hard portions 6 as provided in the above-described arrangement, such deformation will hardly occur in the surfaces of the hard portions 6 as described above. Therefore, the areas of contact with the glass plates 1, 2 will always remain same and both of the glass plates 1, 2 can be maintained spaced apart from each other in a stable manner.

The shock absorbing ability of the spacer 3 can be adjusted if desired through adjustment of the thickness of the soft portion 7 disposed at the center thereof. In this regard, increase of the diameter of the spacer 3 will hardly be feasible since this will impair the visibility of windowpane and this also will result in deterioration in heat insulating performance through increase of "heat-bridge effect" due to the spacer 3. On the other hand, increase of its thickness results only in slight increase in the spacing between the opposing faces 1A, 2A of the glass plates 1, 2, not in any deterioration in the visibility or heat insulating performance. Rather, with increase of thickness of the soft portion 7, the spacer 3 will be made more susceptible to deformation in response to the shearing force along the face direction of the glass plates 1, 2. Therefore, the thickness of the soft portion 7 can be appropriately set, depending on e.g. desired deforming characteristics of the glass plates 1, 2 to be used.

In manufacturing of the spacer 3, there will be effected a step of disposing the hard portions 6 formed of hard metal on opposing sides of the soft portion 7 formed of soft metal and a step of effecting an etching treatment on the outer circumferences of the hard portions 6 and the soft portion 7. In the etching treatment, in comparison with stainless steel for instance, aluminum material will be etched faster.

The exposed area of the soft portion 7 as being sandwiched between the two hard portions 6 is small. Thus, when the shape of the spacer 3 is to be adjusted through the etching treatment, the surfaces of the hard portions 6 will be etched with higher priority whereas the soft portion 7 will be etched only from the lateral side thereof. With this, etching of the soft portion 7 can be suppressed so that the shape of the spacer 3 can be trimmed easily.

The spacer 3 is formed e.g. with the hard portions 6 and the soft portion 7 being in contact with each other under a non-bonded state. Here, the language "non-bonded state" means a simple arrangement such as an arrangement of the hard portions 6 and the soft portion 7 being pressed against each other with an appropriate force. Thus, the language excludes such arrangement as connecting between the hard portions 6 and the soft portion 7 with using an adhesive agent additionally Even with the above-described arrangement, a compressive force due to the atmospheric pressure is applied constantly to the spacer 3 once this spacer 3 has been mounted to the vacuum multilayer glass. Therefore, the relative position between the glass plates 1, 2 and the spacer 3 can be maintained appropriately, even under the state of the hard portions 6 and the soft portion 7 being simply in contact with each other. On the other hand, when there occurs a mutual positional displacement between the glass plates 1, 2 in opposite directions along the face direction, the hard portions 6 and the soft portion 7 can easily move relative to each other along the face direction. For instance, in case a unit area of the glass plates 1, 2 to be born by an individual spacer 3 is large so that the individual spacer 3 is subjected to a large load and a large amount of relative movement occurs in the face direction resulting from warping deformation of the glass plates 1, 2, such easily deformable spacer 3 as configured above will be advantageous.

Alternatively, in forming the spacer 3, the etching treatment can be effected after the hard portions 6 and the soft portion 7 are joined to each other integrally. As a technique for such integral joining the hard portions 6 and the soft portion 7 each other, adhesion using an adhesive material, a thermal diffusion treatment, etc. can be used for instance. With the integral joining between the hard portions 6 and the soft portion 7 as above, the shape of the spacer 3 can be more stable, so that it becomes possible to cause the soft portion 7 to provide its deformation property with higher precision. Since the hard portions 6 and the soft portion 7 are joined to each other, relative movement will occur less likely between the interfaces thereof when a shearing force along the face direction of the glass plates 1, 2 is applied to the spacer 3. Namely, the resistance against the shearing force will be increased. Therefore, the spacer 3 having the above-described arrangement can be suitably used in e.g. a vacuum multilayer glass using glass plates having high strength capable of withstanding large bending.

Other Embodiments

Next, some other embodiments will be explained.

<1> The shape of the spacer 3 can also be angular column shape, ring shape, linear shape, a chain-like shape, etc. instead of the cylindrical shape.

<2> The spacer 3 can be worked into predetermined dimensions by other technique than the etching treatment, such as a cutting by laser or the like, a punching by pressing, etc.

EXAMPLES

Next, some examples of the gap retention member (spacer) relating to the present invention will be shown. It is understood however that the present invention is not limited to these examples.

As shown in structure schematic images in FIG. 6, spacers according to Examples 1-2 and Comparison Examples 1-2 were manufactured. Each of these spacers has a cylindrical shape having a diameter of about 500 μm and a height of about 200 μm. Example 1 is a spacer wherein an aluminum foil having a thickness of 20 μm (corresponding to "soft portion") sandwiched at the center portion of the spacer (material: stainless steel, corresponding to "hard portion"), thus providing an arrangement in the order of stainless steel/aluminum foil/stainless steel in the thickness direction. Example 2 is an integrated spacer including an aluminum foil having a thickness of 20 μm at an intermediate portion of the spacer and integrated therein.

Comparison Example 1 is a unit spacer having no soft portion. Comparison Example 2 is a spacer having aluminum foils at portions opposing to a pair of glass plates respectively. In Example 1 and Comparison Example 2, the aluminum foil(s) and the spacer are not bonded to each other. In Example 2, the aluminum foil and the spacer are integrated (joined) to each other by thermal diffusion treatment.

(Determination of Static Friction Coefficient)

As shown in FIG. 5, each test sample (Examples 1-2, Comparison Examples 1-2) A was placed on a glass plate 11 for determination and another glass plate 12 for determination was placed on the test sample A. Then, a pressure equivalent to the atmospheric pressure was applied thereto by placing a weight 13 on the determination glass plate 12. Under this state, the determination glass plate 12 was moved in the face direction, during which a static friction coefficient of each test sample A was determined.

Incidentally, the determination glass plates were approximately square-shaped glass plates having a thickness of 3 mm and each side of 10 cm in length and these were prepared by a wiping treatment with ethanol and subsequent firing.

The results of determinations are shown in FIG. 6. As shown, in comparison with the unit spacer of Comparison Example 1 (having only hard portion), the average static friction coefficient values of Examples 1 and 2 were approximately ½ to ¼ thereof, and the average static friction coefficient of Example 1 was about ⅓ of that of Comparison Example 2 and the average static friction coefficient of Example 2 was about same as that of Comparison Example 2. Based on these, it can be seen that the spacers of the present invention (Examples 1 and 2) are capable of reducing frictional resistance relative to a glass plate as much as a spacer having aluminum foils on the opposing sides of a glass plate. Namely, the spacers of the present invention (Examples 1 and 2) are capable of allowing relative movement of the glass plates appropriately, like the spacer of Comparison Example 2.

REFERENCE SIGNS LIST

1, 2 glass plate
1A, 2A opposing face
3 spacer (gap retention member)
4 gap
6 hard portion
7 soft portion

The invention claimed is:

1. The combination of a pair of glass plates and a glass panel gap retention member disposed between the pair of glass plates when a circumference of a gap formed between the pair of glass plates with their plate faces opposing each other is sealed to maintain the gap under a depressurized state, the glass panel gap retention member comprising:
    hard portions contacting the pair of glass plates respectively;
    a separate soft portion disposed between the hard portions and having a lower hardness than the hard portions, said separate soft portion formed of a rolling material having a rolling direction extending along the surfaces of the glass plates and arranged to have a rolling direction aligned with surfaces of the glass plates; and
    the soft portion being more susceptible to deformation based on a shearing force effective in a direction along the opposing faces of the glass plates than deformation based on a compressive force effective in a thickness direction perpendicular to the opposing faces of the glass plates.

2. The combination according to claim 1, wherein the hard portions are formed of stainless steel material and the soft portion is formed of aluminum material which is rolled in the direction along the opposing faces.

3. The combination of a pair of glass plates and a glass panel gap retention member disposed between the pair of glass plates when a circumference of a gap formed between the pair of glass plates with their plate faces opposing each other is sealed to maintain the gap under a depressurized state, the glass panel gap retention member comprising:
    hard portions contacting the pair of glass plates respectively;
    a separate soft portion disposed between the hard portions and having a lower hardness than the hard portions, said separate soft portion formed of a rolling material having a rolling direction extending along the surfaces of the glass plates and arranged to have a rolling direction aligned with surfaces of the glass plates; and
    the soft portion being more susceptible to deformation based on a shearing force effective in a direction along the opposing faces of the glass plates than deformation based on a compressive force effective in a thickness direction perpendicular to the opposing faces of the glass plates,
    wherein the hard portions and the soft portion are in contact with each other under a non-bonded state, and the hard portions and the soft portion are retained between the pair of glass plates to receive a compressive force caused by atmospheric pressure.

4. The combination according to claim 1, wherein the hard portions and the soft portion are joined to each other integrally.

5. A method of manufacturing the glass panel gap retention member according to claim 1, the method comprising:
   a disposing step of disposing hard portions formed of a hard metal on opposing sides of a soft portion formed of a soft metal; and
   an etching step of etching the hard portions and the soft portion.

6. The combination according to claim 2, wherein the hard portions and the soft portion are in contact with each other under a non-bonded state.

7. The combination according to claim 2, wherein the hard portions and the soft portion are joined to each other integrally.

8. The combination according to claim 3, wherein the hard portions and the soft portion are arranged such that during displacement of the glass plates in opposite directions along the opposing faces, the hard portions and the soft portion move relative to each other along the face direction.

\* \* \* \* \*